United States Patent
Yamaguchi et al.

(10) Patent No.: US 8,348,024 B2
(45) Date of Patent: Jan. 8, 2013

(54) MOTOR-DRIVEN DISK BRAKE SYSTEM AND CONTROL DEVICE FOR THE MOTOR-DRIVEN DISK BRAKE SYSTEM

(75) Inventors: Tohma Yamaguchi, Kawasaki (JP); Yoshinari Kawahara, Ohita (JP)

(73) Assignee: Hitachi, Ltd., Tokyo (JP)

( * ) Notice: Subject to any disclaimer, the term of this patent is extended or adjusted under 35 U.S.C. 154(b) by 961 days.

(21) Appl. No.: 11/819,684

(22) Filed: Jun. 28, 2007

(65) Prior Publication Data

US 2008/0011560 A1   Jan. 17, 2008

(30) Foreign Application Priority Data

Jun. 30, 2006   (JP) ................................. 2006-182409

(51) Int. Cl.
 *F16D 55/22* (2006.01)
(52) U.S. Cl. ...................................... 188/72.3; 188/156
(58) Field of Classification Search ................. 188/72.1, 188/72.3, 72.7, 72.8, 156–160; 303/157, 303/162; 318/159, 160, 256, 257, 260, 264, 318/281
See application file for complete search history.

(56) References Cited

U.S. PATENT DOCUMENTS

| | | | |
|---|---|---|---|
| 6,186,599 B1* | 2/2001 | Otomo et al. | 303/20 |
| 6,250,436 B1 | 6/2001 | Oikawa et al. | |
| 6,676,230 B2* | 1/2004 | Kuno et al. | 303/114.3 |
| 6,913,122 B2* | 7/2005 | Fujita et al. | 188/156 |
| 2005/0217952 A1* | 10/2005 | Usui | 188/265 |

FOREIGN PATENT DOCUMENTS

JP   2003-113877   4/2003

* cited by examiner

*Primary Examiner* — Bradley King
*Assistant Examiner* — Nicholas J Lane
(74) *Attorney, Agent, or Firm* — Wenderoth, Lind & Ponack, L.L.P.

(57) ABSTRACT

A motor-driven disk brake system is capable of preventing a pressing member from moving beyond a predetermined position at a time of stopping a motor. When a command for system termination is issued, motor current is reduced intermittently, which correspondingly reduces a motor displacement gradually such that a return force is spent gradually on a return displacement of a motor and a piston, thereby preventing a rotational speed of a rotor from increasing. A large accelerated backward movement of the motor and the piston beyond a predetermined position due to inertia is thereby prevented, because the return force does not act all at once during the return displacement of the motor and the piston. Accordingly, the piston is stopped near a standby position of non-braking state before system termination. As a result, a next activation of the motor-driven disk brake system can be conducted promptly.

20 Claims, 12 Drawing Sheets

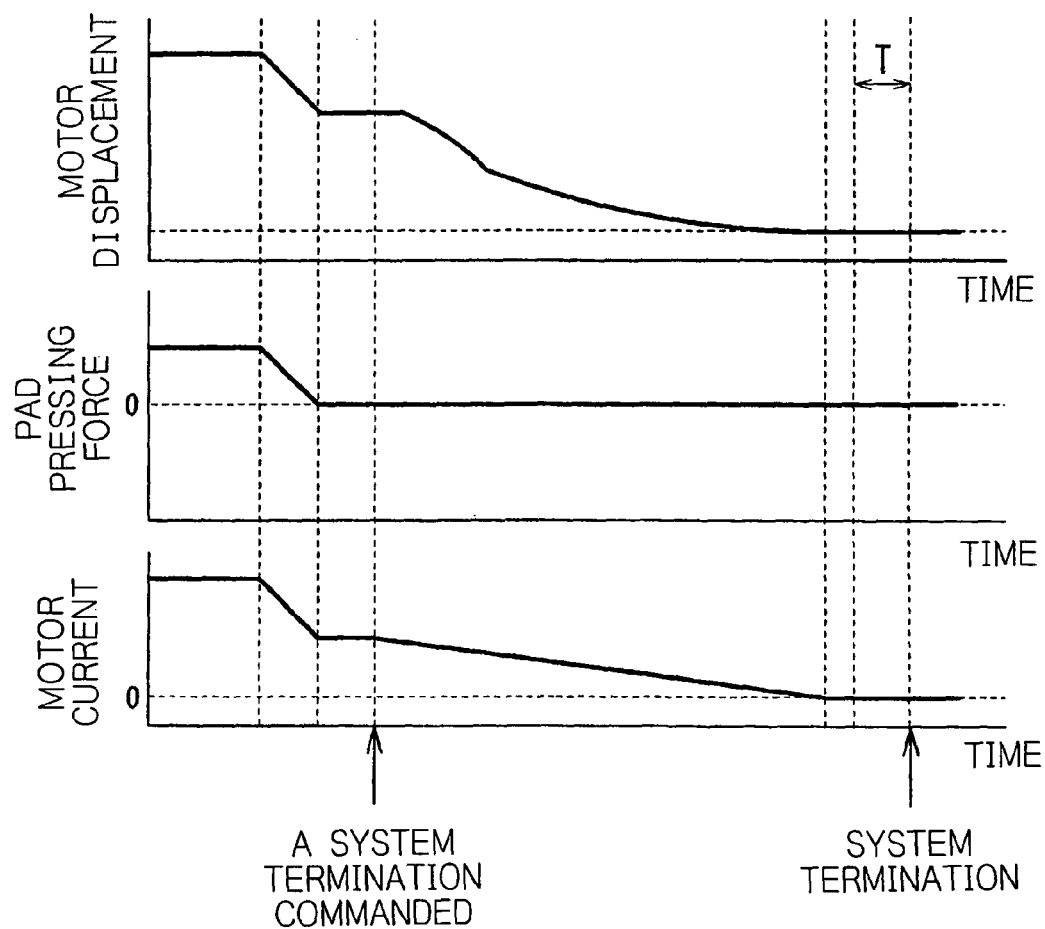

MOTOR-DRIVEN DISK BRAKE SYSTEM AND CONTROL DEVICE FOR THE MOTOR-DRIVEN DISK BRAKE SYSTEM

BACKGROUND OF THE INVENTION (1) Field of the Invention

The present invention relates to a motor-driven disk brake system for generating a braking force by utilizing a motor torque, and a control device for the motor-driven disk brake system.

(2) Description of Related Art

There is a motor-driven disk brake system that comprises: a pressing member (piston) for pressing a brake pad against a disk rotor; and an electric caliper including a motor and a rotary-to-linear motion converter for converting rotation of the motor to a linear motion to transmit the linear motion to the pressing member, such that the pressing member is moved forward according to rotation of a rotor of the motor so as to press the brake pad against the disk rotor, thereby generating a braking force. Normally, the motor-driven disk brake system uses a sensor to detect a stepping force or a stroke applied by a driver to a brake pedal and to control rotation (rotational angle) of the electric motor, based on a detected value, and thereby obtains a desired brake force (pressing force).

Japanese Patent Public Disclosure No. 2003-113877 discloses an example of a motor-driven disk brake system of the above-described type, which has a fail open mechanism in an electric caliper, so as to move back a pressing member when a power supply from a control device to a motor is stopped.

However, the motor-driven disk brake system disclosed in Japanese Patent Public Disclosure No. 2003-113877 often encounters a problem: When the pressing member is moved back upon stop of power supply to the motor as described above, the backward movement of the pressing member is accelerated due to inertia, so as to move the pressing member back beyond a predetermined position. Therefore, when the system is activated next time, it takes a certain amount of time to move the pressing member to a standby position of non-braking state.

BRIEF SUMMARY OF THE INVENTION

The present invention is made in view of the above-described problem. An object of the present invention is to provide a motor-driven disk brake system that prevents a pressing member from moving back beyond a predetermined position when a motor is stopped.

A second object of the present invention is to provide a control device for the motor-driven disk brake system, so as to prevent the pressing member from moving back beyond a predetermined position when the motor is stopped.

The present invention provides a motor-driven disk brake system including: an electric caliper having an electric actuator that is adapted to move forward a pressing member for pressing a brake pad against a rotating body; and a control device for supplying an electric power to the electric actuator to control it, the electric caliper being adapted to return the pressing member in an opposite direction to a direction in which the pressing member presses the brake pad, when a supply of electric power from the control device is stopped, wherein the control device comprises a means for stopping a power supply, the means being adapted to reduce an amount of current and then stop a power supply, so as to gradually return the pressing member, when the power supply to the electric actuator is stopped.

The electric actuator may comprise an electric motor and a rotary-to-linear motion converter for converting a rotary motion of the electric motor to a linear motion, the rotary-to-linear motion converter being adapted to move the pressing member forward. Further, the electric caliper may be provided with a position detecting means for detecting a position of the pressing member, the position detecting means being made of a rotational position detecting means for detecting a rotational position of a rotor of the electric motor, the means for stopping a power supply being adapted to reduce an amount of current to gradually return the pressing member, based on a value detected by the rotational position detecting means.

A rotary motion member of the rotary-to-linear motion converter may also be provided with: a return spring for returning the pressing member in the opposite direction to the direction in which the pressing member presses the brake pad; and an engaging portion for preventing the rotary motion member from being excessively moved back by the return spring. In this case too, the electric caliper may be provided with a position detecting means for detecting a position of the pressing member, the position detecting means being made of a rotational position detecting means for detecting the rotational position of the rotor of the electric motor, the means for stopping a power supply being adapted to reduce an amount of current, based on a value detected by the rotational position detecting means, so as to return the pressing member gradually.

At a predetermined current, the control device may be adapted to hold the pressing member in a standby position, when the brake pad is not pressed against the rotating body by the pressing member.

The means for stopping a power supply may be adapted to reduce an amount of current intermittently.

The means for stopping a power supply may be adapted to reduce an amount of current continuously.

The electric caliper may also be provided with a position detecting means for detecting a position of the pressing member, such that the means for stopping a power supply reduces an amount of current, based on a value detected by the position detecting means, so as to return the pressing member gradually.

The control device may also be provided with an end detecting means for detecting that the pressing member has reached an end position when a power supply is stopped, and a position signal from the position detecting means remains unchanged for a predetermined period of time.

When the means for stopping a power supply is reactivated after the end detecting means detects that the pressing member has reached the end position, the control device may promptly return the pressing member to a predetermined position in front to the end position and then return the pressing member gradually, based on position detection by the position detecting means.

When the means for stopping a power supply is reactivated after being interrupted in the middle of its operation, the means for stopping a power supply may promptly return the pressing member to an interrupted position or a predetermined position in front of the interrupted position and then gradually return the pressing member.

Further, the present invention provides a control device for a motor-driven disk brake system, the control device being adapted to supply an electric power to an electric caliper, such that a pressing member for pressing a brake pad against a rotating body is moved forward by an electric actuator and is moved back in an opposite direction to a direction in which the pressing member presses the brake pad, when a power supply to the electric actuator is stopped, wherein the control device comprises a means for stopping a power supply, the means being adapted to gradually reduce an amount of current and then stop a power supply, so as to gradually return the pressing member, when a power supply to the electric actuator is stopped.

The means for stopping a power supply may be adapted to reduce an amount of current intermittently or continuously.

The electric caliper may be provided with a position detecting means for detecting a position of the pressing member, such that the means for stopping a power supply reduces an amount of current, based on a value detected by the position detecting means, so as to return the pressing member gradually.

The control device may further comprise an end detecting means for detecting that the pressing member has reached an end position when a power supply is stopped, and a position signal from the position detecting means remains unchanged for a predetermined period of time.

When the means for stopping a power supply is reactivated after the end detecting means detects that the pressing member has reached the end position, the control device may promptly return the pressing member to a predetermined position in front to the end position and then return the pressing member gradually, based on position detection by the position detecting means.

When the means for stopping a power supply is reactivated after being interrupted in the middle of its operation, the means for stopping a power supply may promptly return the pressing member to an interrupted position or a predetermined position in front of the interrupted position and then gradually return the pressing member.

BRIEF DESCRIPTION OF THE DRAWINGS

FIG. 12 is a time chart corresponding to the flowchart of FIG. 11.

DETAILED DESCRIPTION OF THE INVENTION

Below, exemplary embodiments of the present invention will be described with reference to the figures.

Figure 1:
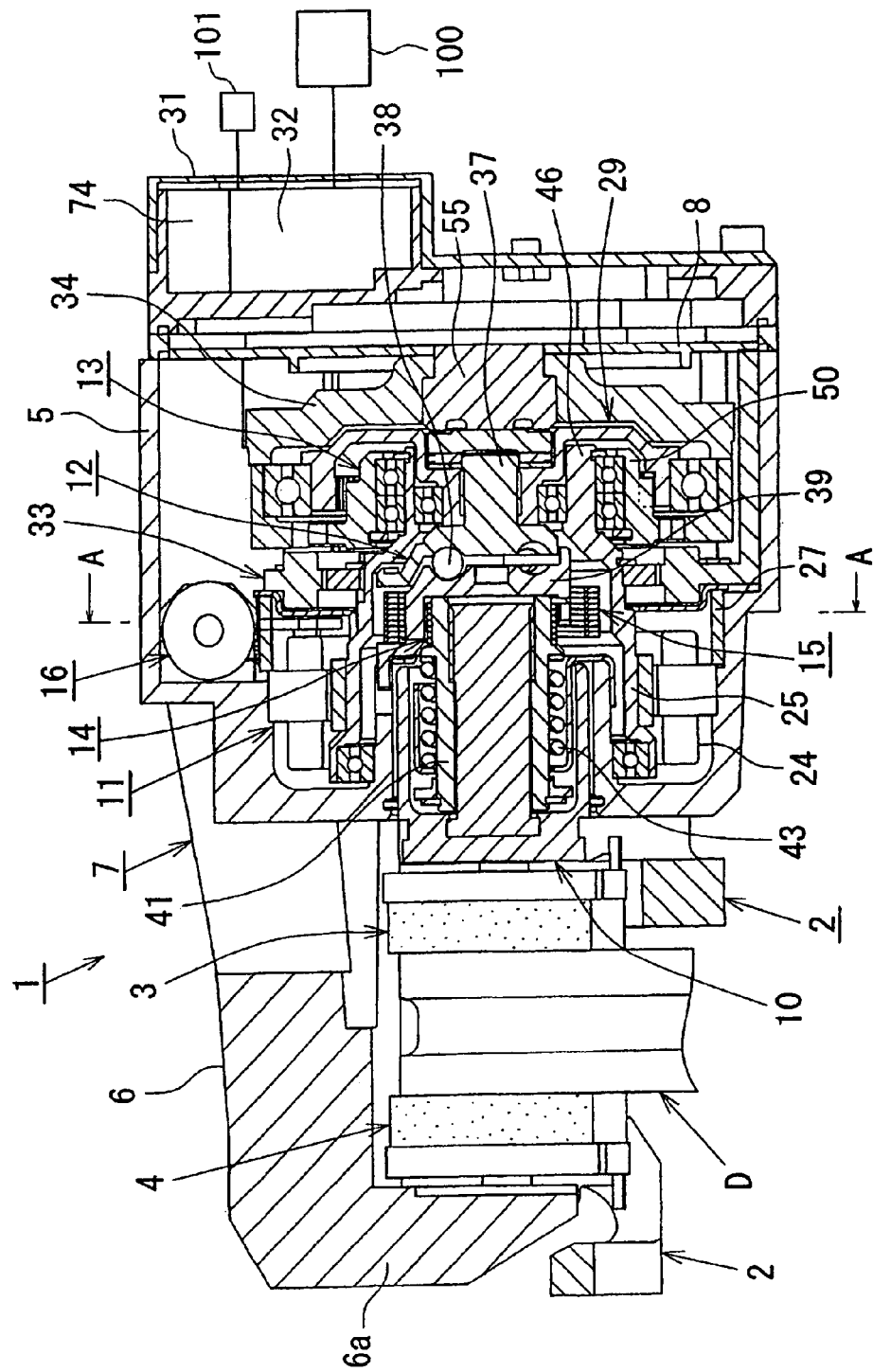
FIG. 1 is a cross-sectional view of an overall structure of a motor-driven disk brake system according to a first embodiment of the present invention.
Figure 2:
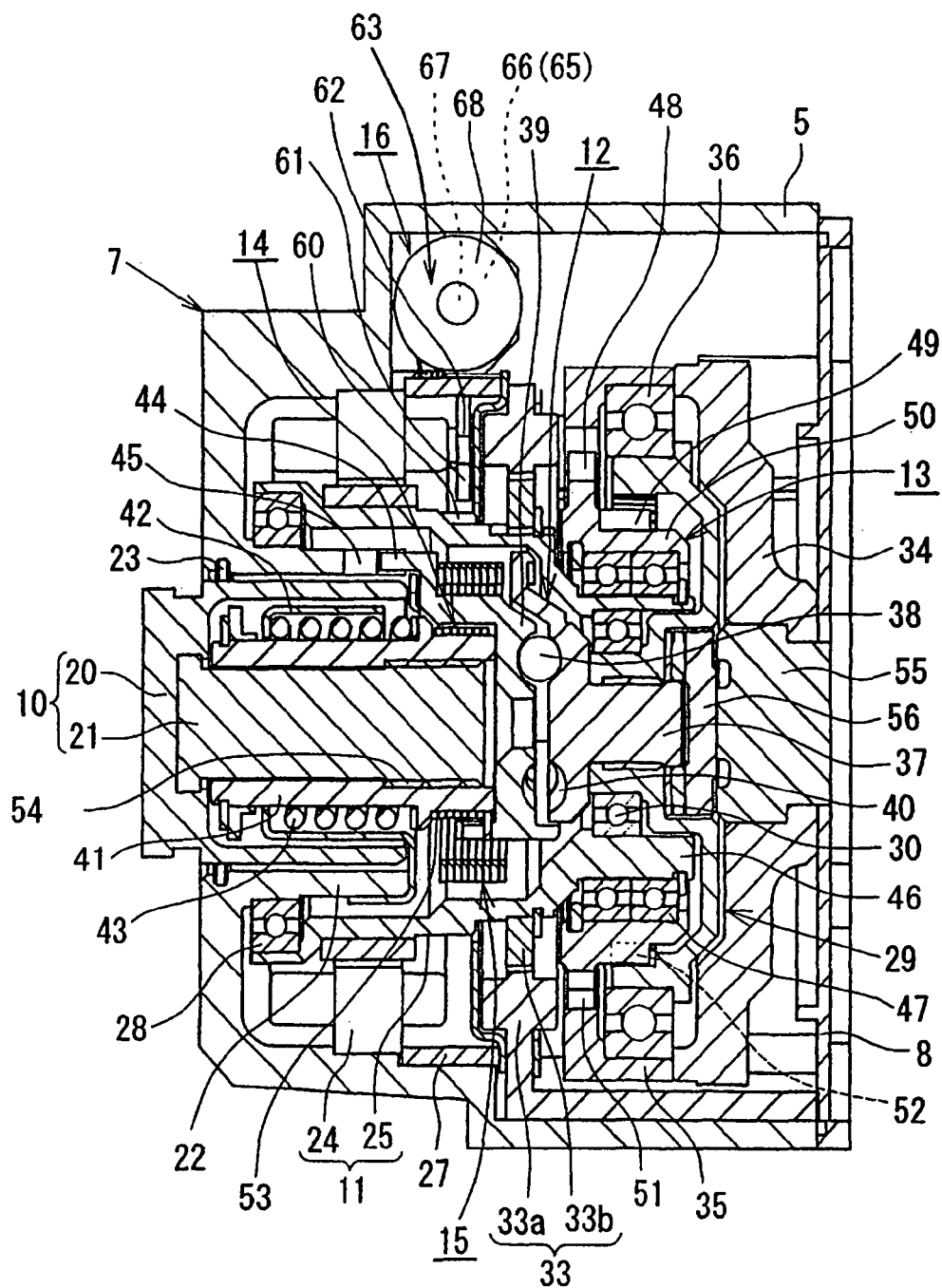
FIG. 2 is an enlarged cross-sectional view of a part of the motor-driven disk brake system of FIG. 1.

FIGS. 1 and 2 show a motor-driven disk brake system according to the first embodiment of the present invention. In FIGS. 1 and 2, reference numeral 1 denotes an electric caliper, which is provided at each wheel of a motor vehicle. The electric caliper 1 generally comprises: a carrier 2 secured to a non-rotating portion (a knuckle or the like) of the vehicle on an inboard side of the disk rotor (rotating body) D; a pair of brake pads 3 and 4 disposed on opposite sides of the disk rotor D; and a caliper body 7 including a casing 5 and a claw 6 extending from the casing 5 over the disk rotor D toward an outboard side of the vehicle. The caliper body 7 is supported by the carrier 2 and is movable in a direction of an axis of the disk rotor D. Similarly, the brake pads 3 and 4 are also supported by the carrier 2 and are movable in the direction of the axis of the disk rotor D. The claw 6 of the caliper body 7 has a claw piece 6a that is disposed adjacent to a rear surface of the brake pad 4 on the outboard side of the vehicle. An inner surface of the casing 5 has a stepped shape, and a rear opening of the casing 5 is covered with a cover plate 8.

The casing 5 of the caliper body 7 contains: a piston (pressing member) 10 for abutting against a rear surface of the brake pad 3 on the vehicle inboard side to press the brake pad 3; a motor (electric actuator) 11; a ball ramp mechanism (rotary-to-linear motion converter) 12 for converting a rotary motion of the motor 11 to a linear motion to transmit the linear motion to the piston 10; a speed reduction mechanism 13 for decelerating the rotation of the motor 11 and transmitting the decelerated rotation to the ball ramp mechanism 12; a pad wear compensating mechanism 14 for adjusting a position of the piston 10 according to wear of the brake pads 3 and 4 to compensate for the pad wear; a coil spring (return spring) 15 serving as a brake release mechanism for automatically moving the piston 10 back to an initial position to release the brake when the motor 11 breaks down during a braking operation; and a parking brake locking mechanism 16 for activating a parking brake.

The piston 10 comprises a cup-shaped body 20 and a shaft portion 21 of a small diameter which are disposed side by side. The body 20 of the piston 10 is slidably fitted via a sealing member 23 into a cylinder 22 formed in the caliper body 7. The motor 11 comprises: a stator 24 fitted into and secured to the casing 5 of the caliper body 7; and a hollow rotor 25 disposed in the stator 24. The stator 24 is pressed into and secured to the stepped portion by a cylindrical support 27 that is fitted into the casing 5 through a rear opening of the casing 5. The rotor 25 has: one end thereof supported via a bearing 28 by the cylinder 22 of the caliper body 7; and the other end supported via a bearing 30 by a rotating body 29, which will be described later.

The motor 11 is a DC brushless motor and is adapted to exert a desired torque on the rotor 25 to rotate it by a desired angle, upon a command from a controller (control device, FIG. 1) 32 in a housing 31 that is attached to an outer side of the casing 5 of the caliper body 7. The rotational angle of the rotor 25 of the motor 11 is detected by a rotation detector (position detecting means) 33 that comprises: a resolver rotor 33a secured to an outer circumferential surface of the rotor 25; and a resolver stator 33b. As the position detecting means, use can be made of a rotation detector other than a resolver, or a potentiometer or the like for detecting a linear displacement of the piston 10.

An annular support plate 34 and a gear member 35, which will be described later, are integrally disposed adjacent to the cover plate 8 in the casing 5. A bearing 36 for supporting the rotating body 29 is tightly placed between the support plate 34 and the gear member 35.

The ball ramp mechanism 12 comprises: a first disk (rotary motion member) 37 connected via a spline to a shaft hole of the rotating body 29; and a second disk (linear motion member) 39 joined with the first disk 37 via a plurality of balls 38. The balls 38 are disposed between three arc-shaped ball grooves 40 formed on opposing surfaces of the first and second disks 37 and 39 along their circumferential direction. The second disk 39 is fitted via a play onto a cylindrical adjuster (pressing member) 41 that forms the pad wear compensating mechanism 14 and will be described later. A return spring (coil spring) 43 is disposed between the adjuster 41 and a spring receiving portion 42 that is placed in the cylinder 22 of the caliper body 7. The second disk 39 is normally subject to an urging force of the return spring 43 via the adjuster 41 and is pressed toward the first disk 37.

The second disk 39 has an engaging projection 44 on a tip thereof. The range of rotation of the second disk 39 is limited by inserting the engaging projection 44 into a groove 45 formed in the cylinder 22 of the caliper body 7 (see FIG. 2). A home position of the second disk 39 is located at a predetermined angle at which the engaging projection 44 is abutted against a groove end of the groove 45 of the cylinder 22, and clockwise rotation R (hereinafter, defined as a normal rotation) viewed from the right side of FIG. 1 or 2 is limited. Therefore, when the first disk 37 is rotated clockwise while the second disk 39 is located at the home position, each ball 38 rolls on an inclined bottom surface of each ball groove 40, so as to move the second disk 39 forward or backward relative to the disk rotor D.

The speed reduction mechanism 13 comprises: an eccentric shaft 46 integrated with the rotor 25; an eccentric wheel 50 having first and second gears (external gears) 48 and 49 on an outer circumference thereof and rotatably fitted around the eccentric shaft 46 via a bearing 47; a fixed gear (internal gear) 51 formed on an inner circumference of a gear member 35 for supporting the rotating body 29 and meshed with the first gear 48 of the eccentric wheel 50; and a movable gear (internal gear) 52 formed on the rotating body 29 and meshed with the second gear 49. The eccentric wheel 50 is engaged with the fixed gear 51 and the movable gear 52 and is thus adapted to revolve according to rotation of the eccentric shaft 46 (rotor 25). Since the number of teeth of the fixed gear 51 is different from that of the movable gear 52, the first disk 37 rotates with the rotor 25 at a certain rotational ratio (speed reduction ratio).

The pad wear compensating mechanism 14 comprises: the cylindrical adjuster 41; and a one-way clutch 53 disposed between the adjuster 41 and the second disk 39 of the ball ramp mechanism 12. The adjuster 41 is operably connected to the piston 10 via a thread portion 54 that comprises: a female thread formed on an inner surface of the adjuster 41; and a male thread formed on an outer circumference of the shaft portion 21 of the piston 10. The one-way clutch 53 is made of a coil spring in this embodiment. At a time of normal rotation of the second disk 39 of the ball ramp mechanism 12, the one-way clutch 53 allows the adjuster 41 to rotate in accordance with the second disk 39. At a time of reverse rotation of the second disk 39, the one-way clutch makes the adjuster 41 skid.

During a normal brake operation (an electric brake operation), the second disk 39 remains in the home position where it abuts against an end (groove end) of the groove 45 of the cylinder 22; therefore, the adjuster 41 and the one-way clutch 53, which constitute the pad wear compensating mechanism 14, move forward or backward with the second disk 39 relative to the disk rotor D, and the piston 10 moves correspondingly. On the other hand, when the second disk 39 rotates in a reverse direction from the home position, the adjuster 41 does not rotate but remains in the home position. Therefore, when the second disk 39 rotates in the normal direction afterwards, the adjuster 41 rotates in accordance with the normal rotation of the second disk 39. As the adjuster 41 rotates, the piston 10, which is operably connected to the adjuster 41 via the thread portion 54, moves forward, such that the position of the piston 10 changes relative to the second disk 39, thereby compensating for any pad wear. In the present embodiment, the piston 10 and the adjuster 41, which are moved forward by the second disk (rotary-to-linear motion converter) 39, constitute a pressing member.

During a non-braking operation, the piston 10 is maintained at the standby position by applying a predetermined amount of current to the motor 11, so as to ensure a predetermined pad clearance between the disk rotor D and the brake pad 3. When the brake is operated, the pad clearance is first reduced according to a forward movement of the piston 10 from the standby position. When the pad clearance is eliminated, the brake pad 3 is pressed against the disk rotor D. At the same time, the caliper 1 is moved relative to carrier 2 (to the right side of FIG. 1) by a reaction force against this pressing force. As a result, the disk rotor D is pressed between the brake pads 3 and 4 to start a braking operation and accordingly exert a thrust on the piston 10. In the present embodiment, a thrust detection sensor 55 for detecting a thrust exerted on the piston 10 is disposed adjacent to the cover plate 8 in the casing 5 of the caliper body 7. The thrust detection sensor 55 comprises a load cell. The first disk 37, which is a constituent component of the ball ramp mechanism 12, is abutted against the thrust detection sensor 55 via a seat 56.

The coil spring 15 serving as the brake release mechanism is disposed between the first and second disks 37 and 39, which are constituent components of the ball ramp mechanism 12. The coil spring 15 is disposed between the first and second disks 37 and 39 to provide a predetermined preload. In this way, the second disk 39 remains in the home position where it normally abuts against the groove end of the cylinder 22 of the caliper body 7. On the other hand, when the first disk 37 is rotated in a direction (piston thrusting direction) to exert a brake force, a torque is stored in the coil spring 15, since the second disk 39 is fixed in place. Therefore, in case the motor 11 brakes down in a braking operation, the torque stored in the coil spring 15 can be used to return the first disk 37 to its initial position.

The parking brake locking mechanism 16 comprises: a claw wheel 60 integrally formed on an outer circumferential surface of the rotor 25 of the motor 11; and a drive unit 63 including a swinging arm 62 with an engaging claw 61 on a tip thereof, the engaging claw 61 being capable of engaging with and disengaging from the claw wheel 60.

The drive unit 63 comprises: a solenoid 68 in which a plunger 67 is slidably accommodated in a housing 66 that contains a coil 65; and a torsion spring (not shown) for urging the swinging arm 62 in the clockwise direction R viewed from the right side of FIG. 1. The rotational direction opposite the clockwise direction R is referred to as a counterclockwise direction L.

The swinging arm 62 is normally urged by the torsion spring in a direction (clockwise direction R) so as to disengage the engaging claw 61 from the claw wheel 60. The solenoid 68 is structured as an attracting solenoid adapted to draw the plunger 67 into it when an electric current is applied to the coil 65 that is provided at a position corresponding to the solenoid 68. Therefore, according to the electric current applied to the solenoid 68, the swinging arm 62 moves the engaging claw 61 in the direction (counterclockwise direction L) so as to engage it with the claw wheel 60. The electric current through the coil 65 of the solenoid 68 is controlled by a drive circuit 74 that is connected to the controller 32 (see FIG. 1) in the housing 31 that is disposed outside of the casing 5 of the caliper body 7.

The controller 32 is connected to a master controller 100 for generating a command for a operation of a brake and a command for a release of a brake to the motor-driven disk brake system and a command for system termination. A control in section (e), which will be described below, is executed by receiving the command for system termination, when the ignition switch is turned off for generation of the command for system termination by the master controller 100 or when a predetermined amount of time has elapsed after a brake operation is conducted with the ignition switch off. In other words, the control device 32 not only executes a control of each member related to the normal/parking brake, as will be described in sections (a) to (d) below, but also has a function of lowering a motor current (an electric current applied to the motor 11) and then stopping the supply of electric power to the motor 11, so as to return the piston 10 gradually when the motor-driven disk brake system is shut down, as will be described in section (e) below. The master controller 100 is connected to a brake-pedal force sensor (not shown), a parking brake switch (not shown), and so on, to command the controller 32 to operate and release a brake, based on a signal from the pedal force sensor and so on.

Upon a start of an operation of the motor-driven disk brake system, the rotation detector (resolver) 33 is commanded by the controller 32 to start detecting a rotational position (hereinafter referred to as "motor position" or "motor displacement point") of the rotor 25 of the motor 11. Data (motor displacement point) detected by the rotation detector 33 are stored in a memory 101 connected to the controller 32. Detection of the motor displacement point by the rotation detector 33 and storage of the motor displacement point in the memory 101 are conducted by a routine separate from that shown in a flowchart of FIG. 3 that is executed by the controller 32. The flowchart of FIG. 3 will be described later. During a process of the flowchart of FIG. 3, the controller 3 receives data (motor displacement point) detected by the rotation detector 33 as an input from the rotation detector 33 or the memory 101. This feature is also incorporated into other embodiments, which will be described later.

Next, operation of the motor-driven disk brake system of the above-described embodiment, which consists of (a) a normal brake step, (b) a normal brake release step, (c) a parking brake activation step, (d) a parking brake release step, (e) a step of shutting down the motor-driven disk brake system, will be described step by step.

(a) The Normal Brake Step

In an operation as a normal motor-driven brake, the master controller 100 calculates a brake force, which is to be allocated to each wheel, upon an input of a driver's brake operation signal from the pedal force sensor and transmits to the control device 32 for each wheel a command for a brake operation according to the allocated value. Based on this command, the rotor 25 of the motor 11 is rotated in the counterclockwise direction L viewed from the right side of FIG. 1. Then the eccentric wheel 50, which is attached via the bearing 44 to the eccentric shaft 46 integrated with the rotor 25, starts revolving. Correspondingly, the first disk (rotary motion member) 37 in the ball ramp mechanism 12 starts rotating with the rotor 25 at a certain rotational ratio in the counterclockwise direction L viewed from the right side of FIG. 1. This allows the balls 38 in the ball ramp mechanism 12 to roll between the ball grooves 40, thereby moving the second disk (linear motion member) 39 forward. This forward movement of the second disk 39 is transmitted via the adjuster 41, which is a constituent component of the pad wear compensating mechanism 14, to the piston 10.

If there is no pad wear, the piston 10 is moved forward (i.e. moved in a first direction) from the standby position through a position of pad clearance reduction, so as to press the brake pads 3 and 4 against the disk rotor D and exert a brake force according to a torque of the motor 11. In the meantime, the torque is stored in the coil spring 15 serving as a brake release mechanism.

During the motor-driven brake operation, a supply of an electrical current to the solenoid 68 of the parking brake locking mechanism 16 is shut off, such that the swinging arm 62 is swung around a point of supporting a swinging motion in the clockwise direction R viewed from the right side of FIG. 1 under the influence of a torsion spring. In this way, the engaging claw 61 at the tip of the swinging arm 62 is positioned so as to be slightly removed from the claw wheel 60 above the rotor 25 of the motor 11. As a result, the rotor 25 is smoothly rotated in the counterclockwise direction L viewed from the right side of FIG. 1 to ensure a function of the motor-driven brake.

(b) The Normal Brake Release Step

In a step of releasing the brake, the rotor 25 of the motor 11 is rotated by the master controller 100 and the controller 32 in the clockwise direction R viewed from the right side shown in FIG. 1 in response to a release operation by the driver. Correspondingly, the balls 38, which are constituent components of the ball ramp mechanism 12, return to the initial position of the ball grooves 40. At this time, an urging force of the return spring 43 acts on the second disk 39, such that the second disk 39 and the adjuster 41, which is a constituent component of the pad wear compensating mechanism 14, return together to move the piston 10 backward (i.e., in a second direction opposite to the first direction) and remove the brake pads 3 and 4 from the disk rotor D for a brake release. At this time, a supply of an electric current to the solenoid 68 of the parking brake locking mechanism 16 is shut off, so that the engaging claw 61 at the tip of the swinging arm 62 is held in a state in which the engaging claw 61 is slightly removed from the claw wheel 60 above the rotor 25 of the motor 11. As a result, the rotor 25 is smoothly rotated in the clockwise direction R viewed from the right side of FIG. 1, so as to ensure a release of the motor-driven brake.

(c) The Parking Brake Activation Step

In order to activate a parking brake, the master controller 100 and the controller 32 start a braking process in response to a signal of a parking brake switch operation by the driver, so as to rotate the rotor 25 of the motor 11 in the counterclockwise L viewed from the right side of FIG. 1. In this way, the piston 10 moves forward to press the brake pads 3 and 4 against the disk rotor D to exert a brake force, as in the above-described parking brake operation. When the braking force reaches a predetermined value afterward, an electric current is applied by the controller 32 via the drive circuit 74 to the coil 65 of the solenoid 68 in the parking brake locking mechanism 16 for a short period of time, and a supply of an electric current to the motor 11 is turned off subsequently. When the electric current is applied to the coil 65 of the solenoid 68 for a short period of time, the plunger 67 is drawn into the housing 66 against the urging force of the torsion spring, while the swinging arm 62 is swung around the point (not shown) of supporting the swinging motion, in the counterclockwise direction L viewed from the right side shown in FIG. 1. In this way, the engaging claw 61 at the tip of the swinging arm 62 is fitted (engaged) between the teeth of the claw wheel 60 above the rotor 25 of the motor 11. As a result, rotation of the rotor 25 in the clockwise direction R viewed from the right side as shown in FIG. 1 is restricted to establish the engagement of the parking brake. When the supply of the electric current to the motor 11 is turned off, a torque in the clockwise direction R viewed from the right side as shown in FIG. 1 is exerted on the rotor 25 of the motor 11 under the influence of the rigidity of the caliper or the like. In this way, the engaging claw 61 is pressed firmly against a surface of the teeth of the claw wheel 60, thereby engaging the parking brake with enhanced stability.

(d) The Parking Brake Release Step

When the parking brake switch is released by the driver to release the parking brake, an electrical current is applied by the master controller 100 and the controller 32 to the motor 11 to slightly rotate the rotor 25 in the counterclockwise direction L viewed from the right side of FIG. 1, as in the operation of the motor-driven brake, and to also rotate the claw wheel 60 of the parking brake locking mechanism 16 with the rotor 25 slightly in the counterclockwise direction viewed from the right side of FIG. 1. In this way, a pressing force acting on the engaging claw 61 is released. At this time, since the supply of electric current to the coil 65 of the solenoid 68 is turned off, the swinging arm 62 is swung by the urging force of the torsion spring in the clockwise direction R viewed from the right side of FIG. 1 in response to the release of the pressing force, to thereby disengage the engaging claw 61 from the teeth of the claw wheel 60. Subsequently, by properly timing to rotate the rotor 25 of the motor 11 in the clockwise direction R viewed from the right side as shown in FIG. 1, the rotor 25 is allowed to rotate in the clockwise direction R viewed from the right side as shown in FIG. 1 without the claw wheel 60 making any contact with the engaging claw 61, thereby releasing the parking brake.

(e) The Operation of Shutting Down the Motor-Driven Disk Brake System

Figure 3:
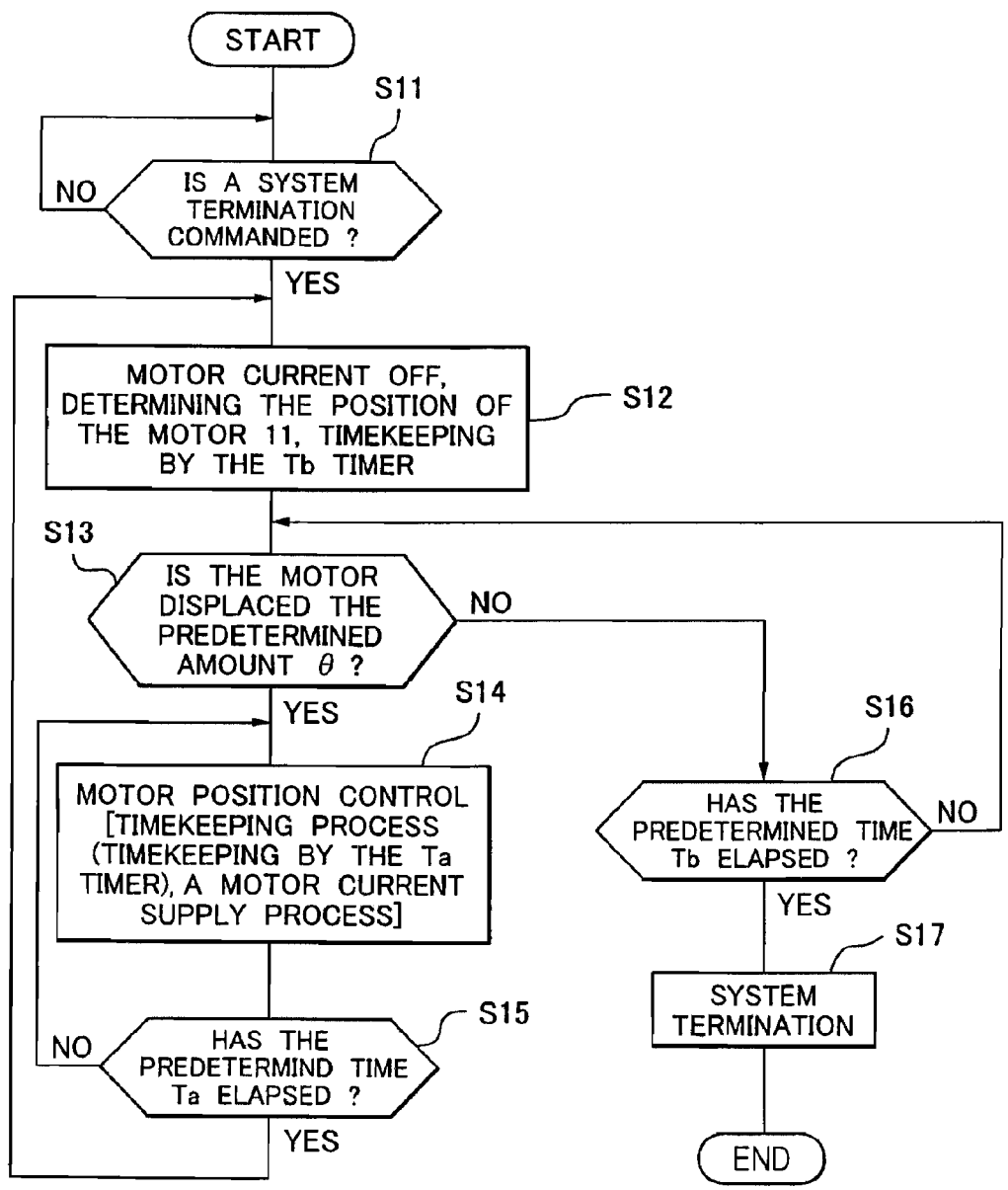
FIG. 3 is a flowchart of a control algorithm executed by a control device of FIG. 1.

In this operation, the controller 32 processes the control algorithm shown in FIG. 3. The operation will be described with reference to FIGS. 3 and 4, below.

First, the controller 32 determines whether it has received a command for system termination from the master controller 100 (step S11).

Figure 4:
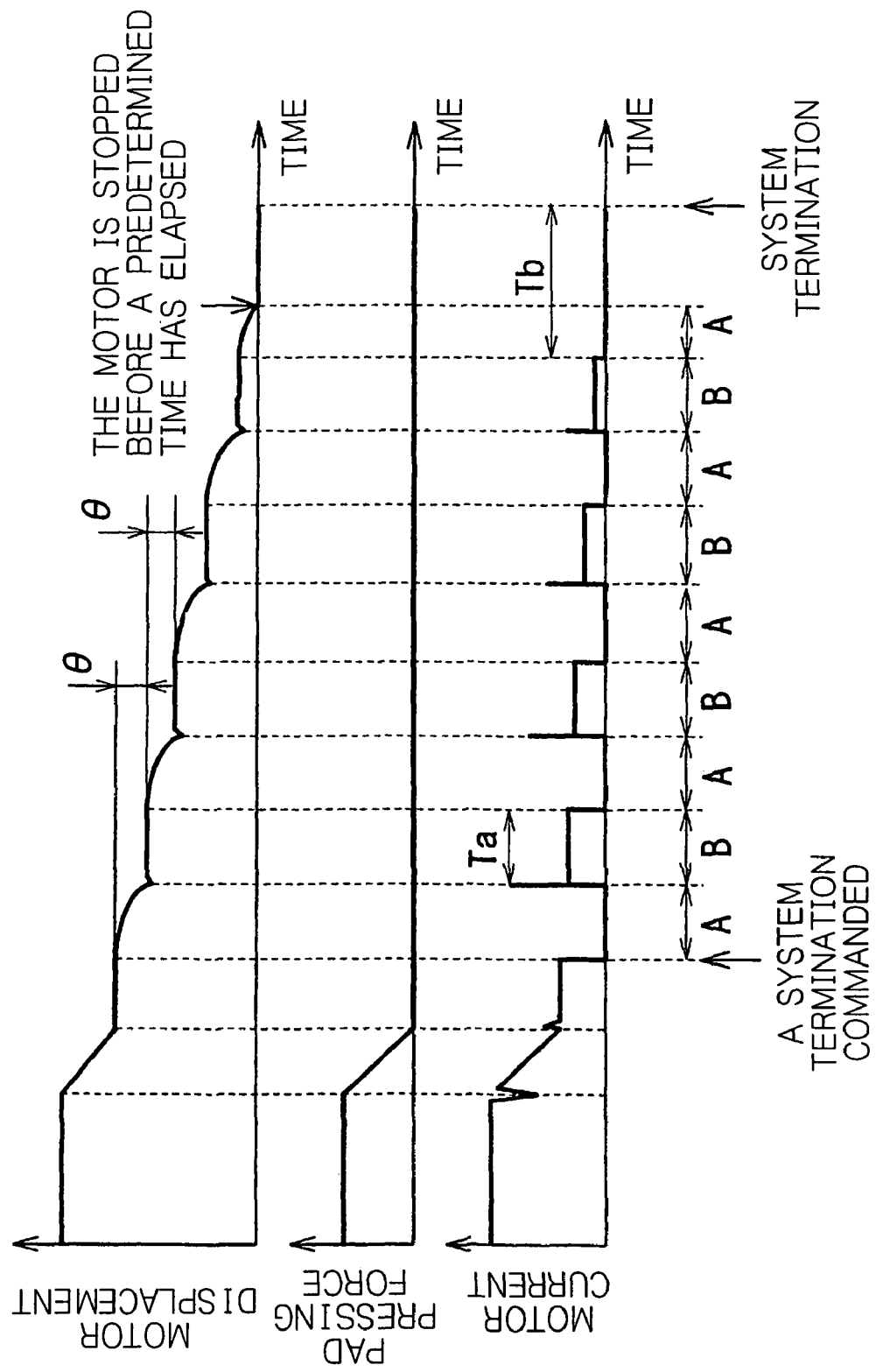
FIG. 4 is a time chart to be referred to in describing effects of the motor-driven disk brake system of FIG. 1.

If it is judged yes (a command for system termination received) in step S11, the electric current applied to the motor 11 (hereinafter, referred to as the motor current) is turned off (step S12), as shown in FIG. 4. When the motor current is turned off, the motor 11 is displaced in a reverse direction by a return force such as a torque stored in the coil spring 15, so as to return the piston 10.

In step 12, in addition to the above-described operation (of turning off the motor current), the controller 32 receives an input of data detected by the rotation detector (resolver) 33 and determines the position of the motor 11 (the rotational position of the rotor 25 of the motor 11, which is hereinafter referred to as a motor displacement point or a motor displacement) after the timing when the motor current is turned off. The detection of the position of the motor 11 by the rotation detector 33 is conducted by a routine which is separate from the control algorithm shown in FIG. 3, as described above. Data on the detected position is used, as required, by the control algorithm (in a judging process in step S14 and so on).

In step S12, timekeeping is started by a Tb timer (not shown) for comparison with a predetermined time Tb, which will be described later. In this case, before the start of timekeeping by the Tb timer, the Tb timer is reset to clear data on time that has been kept previously.

With the motor current off, it is judged whether the motor 11 has been displaced by a predetermined amount $\theta$ (whether the motor displacement has reached the predetermined amount $\theta$) (step S13), as shown in FIG. 4, so as to prevent the motor from being displaced rapidly to the standby position of non-braking state. If it is judged yes (the motor 11 has been displaced by the predetermined amount $\theta$) in step S13, a control (motor position control) for applying (turning on) a predetermined amount of motor current is conducted (step S14), as shown in FIG. 4, so as to hold the motor 11 at the position of the motor 11 (the motor displacement point).

The amount $\theta$ is predetermined experimentally as an amount of rotational movement in which the motor rotor 25 starts to be accelerated by the return force.

In the motor position control of step S14, first, a timekeeping process is conducted, and then a process of applying the motor current (motor current applying process) is conducted.

The timekeeping process in step S14 is conducted as follows: timekeeping is conducted by the Ta timer (not shown) for comparison with the predetermined time Ta, which will be described later. If the motor current is off at this time (see intervals A in FIG. 4) (if the process proceeds to Step S14 after it is judged yes in step S13), timekeeping is started after the Ta timer is reset to clear data on time that has been kept previously. On the other hand, if the motor current is on (see intervals B in FIG. 4) (if the process proceeds to step S14 after it is judged no in step S15, which will be described later), the resetting is not conducted, but additional timekeeping is conducted.

In the motor current applying process of step S14, the motor current is turned on if the motor current has been off thus far (if the process proceeds to step S14 after it is judged yes in step S13). On the other hand, if the motor current is on (being applied) (if the process proceeds to step S14 after it is judged no in step S15), the motor current is controlled to remain on. This control can stop rotation of the rotor 25 of the motor 11 by the return force of the coil spring 15.

After step S14, it is determined whether the predetermined time Ta preset by the timekeeping data in the Ta timer has passed, that is, whether the predetermined time Ta has elapsed since the instant of turning on the motor current in step S14 (step S15). If it is judged no in step S15, then the process returns to step S14. If it is judged yes in step S15, then the process returns to step 12. The predetermined time Ta is set to be a time interval, for example, 200 to 300 ms, in which rotation of the rotor 25 can be completely stopped by a current supply.

An interval B in FIG. 4 corresponds to the time it takes to complete a loop of "no in step S15" to "step S14" to "step S15" in FIG. 3.

If it is judged no in step S13, it is determined whether a predetermined time Tb that has been preset (FIG. 4) has elapsed (step S16). If it is judged no in step S16, the process returns to step S13. The time interval A in FIG. 4 corresponds to the time it takes to complete a loop of "no in step S16" to "step S13" to "step S16" in FIG. 3. Tb is set at, for example, 500 ms, which is longer than Ta.

If it is judged yes in step S16, that is, if the predetermined time Tb is judged to have elapsed in a state in which the motor 11 has not been displaced the predetermined amount $\theta$, the supply of electric power to the motor-driven disk brake system is stopped to terminate the operation of the motor-driven disk brake system (step S17), assuming that the motor displacement has reached an end point of rotation (not shown). In step S17, the current motor displacement point is recorded as the end point of rotation (hereinafter also simply referred to as an end point) in the memory 101 connected to the controller 32, before the process of terminating the operation of the motor-driven disk brake system. The process of recording the end in the memory 101 in step S17 constitutes an end detecting means. It is to be noted that if processes of steps S22 and S23 of a second embodiment, which will be described later, are not conducted, it is not necessary to record the end in the memory 101 (the end detecting means is not necessary).

In the first embodiment, when the controller 32 receives a command for system termination from the master controller 100, the process of the interval A (a loop of "no in step S16" to "step 13" to "step S16") and the interval B ("no in step S15" to "step S14" to "step S15") is repeated, as shown in FIG. 4 (this repeated process and step S17 constitute a means for stopping an electric power supply) so as to reduce the motor current intermittently. In this way, the motor displacement is gradually decreased, while reducing the rotational acceleration of the rotor 25. Further, the return force such as a torque stored in the coil spring 15 is gradually spent on the return displacement of the motor 11 and the piston 10, so as to also prevent the rotational speed of the rotor 25 from increasing, and the motor displacement and the return of the piston can be smoothly brought to a halt.

This prevents a large accelerated backward movement of the motor 11 and the piston 10 (and a backward movement of the piston 10 beyond a predetermined position) due to inertia, which may occur when the return force such as a torque stored in the coil spring 15 acts all at once on the return displacement of the motor 11 and the piston 10. As a result, the piston 10 can be properly stopped near the standby position of non-braking state before the system termination.

As described above, when a command for system termination is issued, the piston 10 is properly stopped near the standby position of non-braking state to terminate the system. Therefore, when the motor-driven disk brake system is activated the next time, it takes a lesser amount of time to move the piston to the standby position of non-braking state. As a result, the motor-driven disk brake system can be activated promptly.

Particularly, in a case that the end point of rotation of the rotor 25 of the motor 11 is set, the motor current is intermittently decreased to reduce the rotational speed of the rotor 25 when the supply of the electric current to the motor 11 of the motor-driven disk brake system is turned off. Therefore, the rotor (rotating member) 25 of the motor 11 can reach the end point of rotation without any noise of collision. Further, a shock that occurs when the rotor (rotating member) 25 reaches the end point of rotation can be softened; therefore, the strength of the rotor (rotating member) 25 of the motor 11 and a member for supporting the rotor 25 can be reduced. As a result, a size of the brake can be reduced.

In the first embodiment, when the process of FIG. 3 (hereinafter, for convenience, referred to as a control for detecting an end point of rotation) is ended once, the end point of rotation is recorded in the memory 101 connected to the controller 32 in step S17. Utilizing the fact that the end point of rotation is recorded in the memory 101 by conducting the control for detecting an end point of rotation, the following control procedure (second embodiment) can be taken to reduce an amount of time it takes until a system termination after braking again. Below, the second embodiment will be described with reference to FIGS. 5 and 6.

Figure 5:
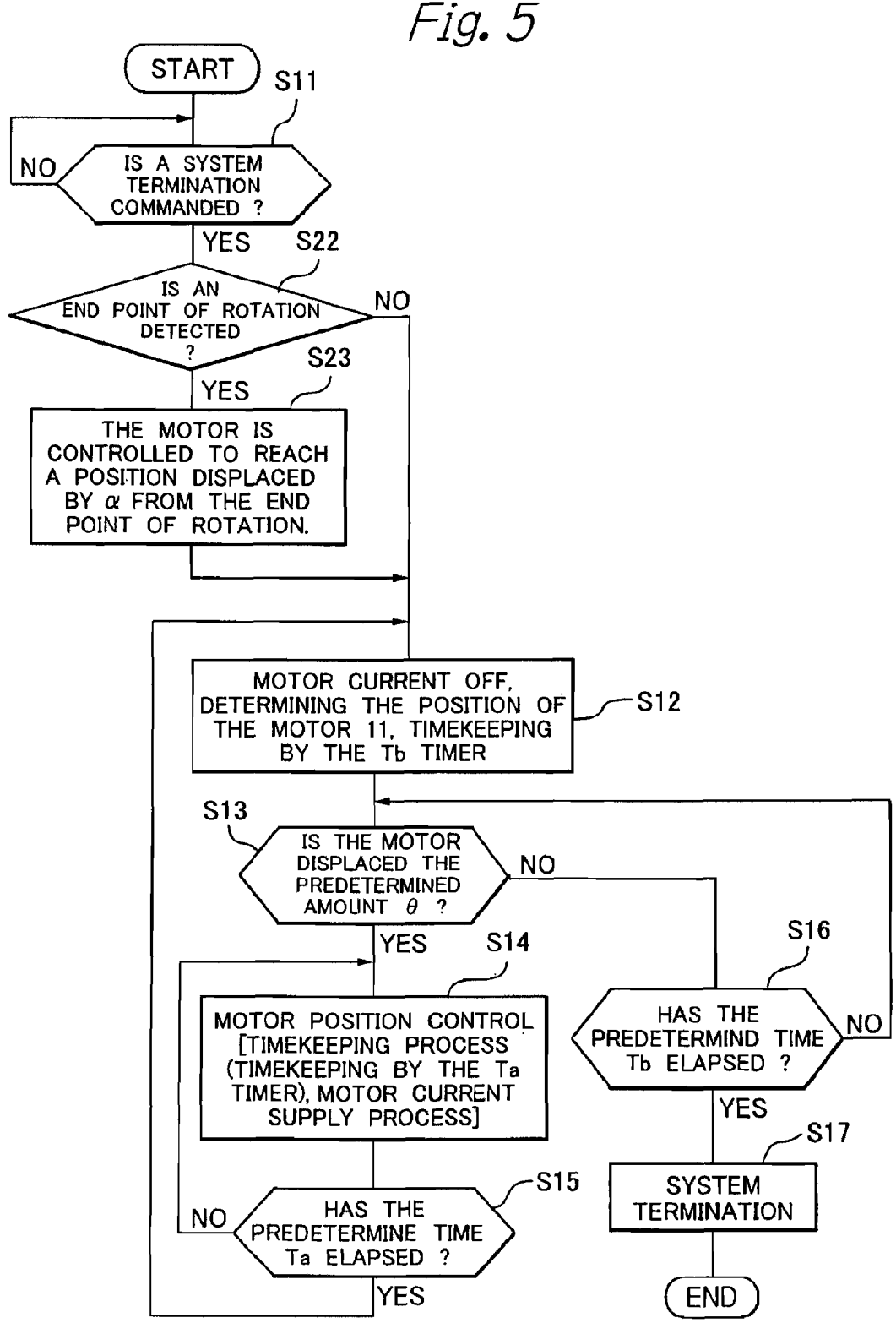
FIG. 5 is a flowchart of operation of a controller 32 used for a motor-driven disk brake system according to a second embodiment of the present invention.
Figure 6:
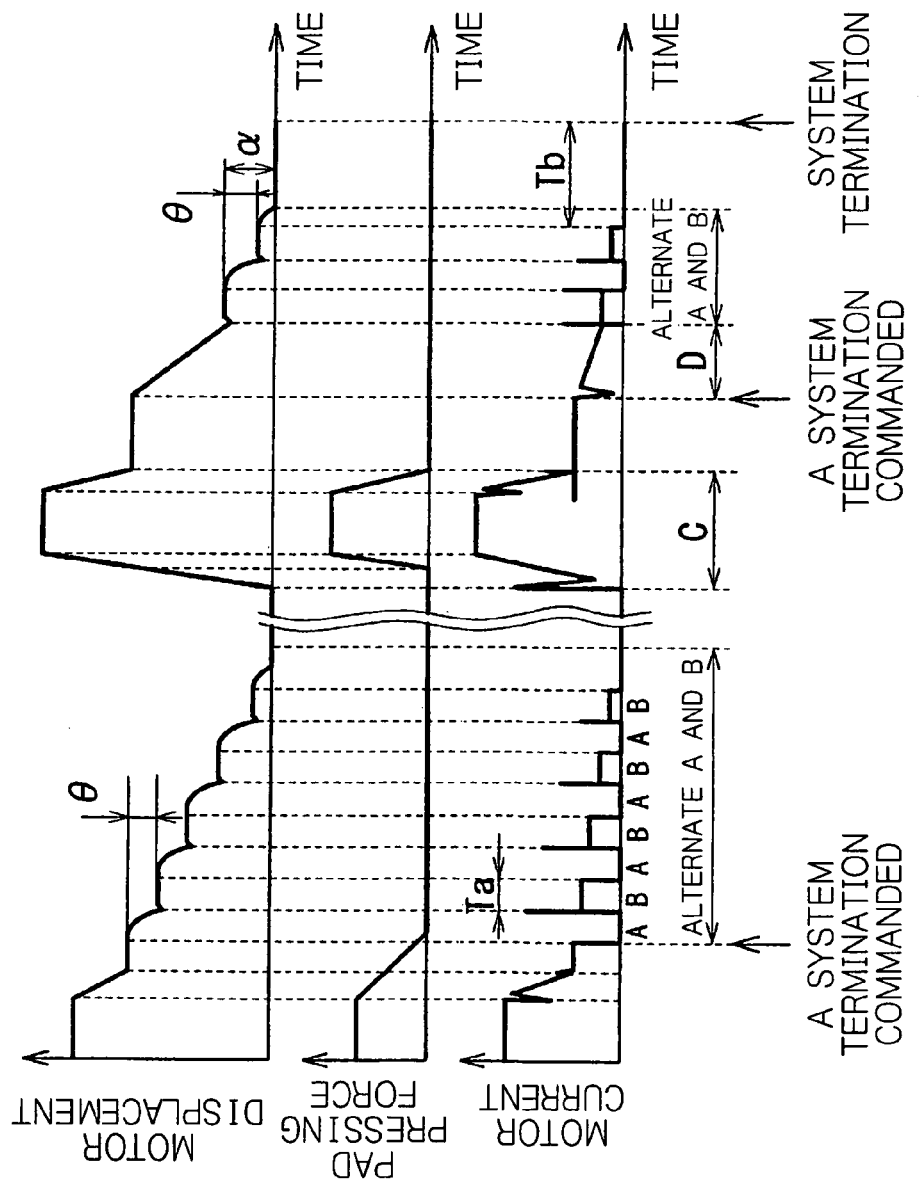
FIG. 6 is a time chart corresponding to the flowchart of FIG. 5.

FIG. 5 is a flowchart of the contents of the process of the control algorithm used in the second embodiment. FIG. 6 is a time chart showing effects of the second embodiment.

In the second embodiment, generally, a first brake operation (normal brake control) is conducted as shown on the left side of FIG. 6, and a system termination is commanded in this step, and subsequently, a first control for detecting the end point of rotation (a section of "alternate intervals A and B" on the left side of FIG. 6) is conducted. Just before the end of the first control for detecting an end point of rotation, the position (end point of rotation) of the motor 11 is recorded. Subsequently, a second brake operation (normal brake control) is started to increase a pad pressing force to exert a brake force (interval C in FIG. 6); then after a process of interval D is conducted upon another command for system termination, a control for detecting an end point of rotation is conducted again (the section of "alternate intervals A and B" on the right side of FIG. 6).

In the second embodiment, if it is judged yes in step S11 (if a command for system termination is received), as shown in FIG. 5, it is determined whether an end point of rotation has already been detected (step S22). If it is judged no in step S22, the process proceeds to step S12. Subsequently, a process similar to that shown in FIG. 3 is conducted to record an end point of rotation in the memory 101, and the system is terminated (first system termination, step S17).

Subsequently, when a command for system termination (yes in step S11) is issued, the process proceeds to step S22 where it is judged yes. Then a control of motor displacement (interval D in FIG. 6) is conducted to bring the motor 11 to a rotational position where the piston is pressed a predetermined amount α from the motor displacement point at the end point of rotation (step S23). The reason for providing the motor displacement point with the predetermined amount α in front of the end point of rotation is to prevent the rotor 25 from returning excessively due to its rotational acceleration. However, if such a concern can be ignored, the predetermined amount α can be eliminated.

Step S23 is followed by step S12. From this step, a process similar to that shown in FIG. 3 is conducted. That is, an operation similar to alternate intervals A and B, as shown in FIG. 4, is conducted in the section of "alternate intervals A and B" on the right side of FIG. 6.

By conducting the process of step S23, the motor displacement point has been already brought to near the end point of rotation in step S23. Therefore, the motor displacement point is guided to the end point of rotation with a reduced number of intervals A and B repeated after step S23.

In the second embodiment, since the motor 11 is already displaced to near the end point of rotation by the process of step S23, the number of intervals A and B repeated in the section (the section of "alternate intervals A and B" on the right side of FIG. 6) can be reduced. As a result, the time required to terminate the system can be reduced.

In the second embodiment as well as the first embodiment, a large backward movement of the motor 11 and piston 10 due to inertia (and thus a backward movement of the piston 10 beyond a predetermined position), which may occur when the return force such as a torque stored in the coil spring 15 acts all at once on the motor 11 and piston 10 to displace backward, can be prevented so as to stop the piston 10 in the vicinity of the standby position of non-braking state before the system termination.

Next, a control procedure (the third embodiment) will be described with reference to the flowchart of FIG. 7 and the time diagram of FIG. 8. This control procedure is taken when, during the control (control for detecting an end point of rotation) of FIG. 3 or 5, a system termination is interrupted by an operation such as turning the ignition switch on or applying the brake, before the motor 11 reaches the end point of rotation (that is, a command for system termination is issued but cancelled, which is hereinafter referred to as a cancellation of system termination (or also referred to as a cancellation of a command for system termination)), and the motor 11 is rotated again to the end point of rotation after a normal brake control. In this control, a motor displacement point when the control for detecting an end point of rotation is interrupted by a cancellation of system termination (this motor displacement point at the time of this interruption is referred to as an end detection interrupted position) is recorded in the memory 101 connected to the controller 32. At the same time, the position of the end point of rotation, which is stored in the memory 101, is cleared.

Therefore, if a command for system termination is issued again, time required for the system termination can be reduced by a displacement control to move the motor 11 beforehand to or near in front of the motor displacement point at the previous interruption.

Figure 7:
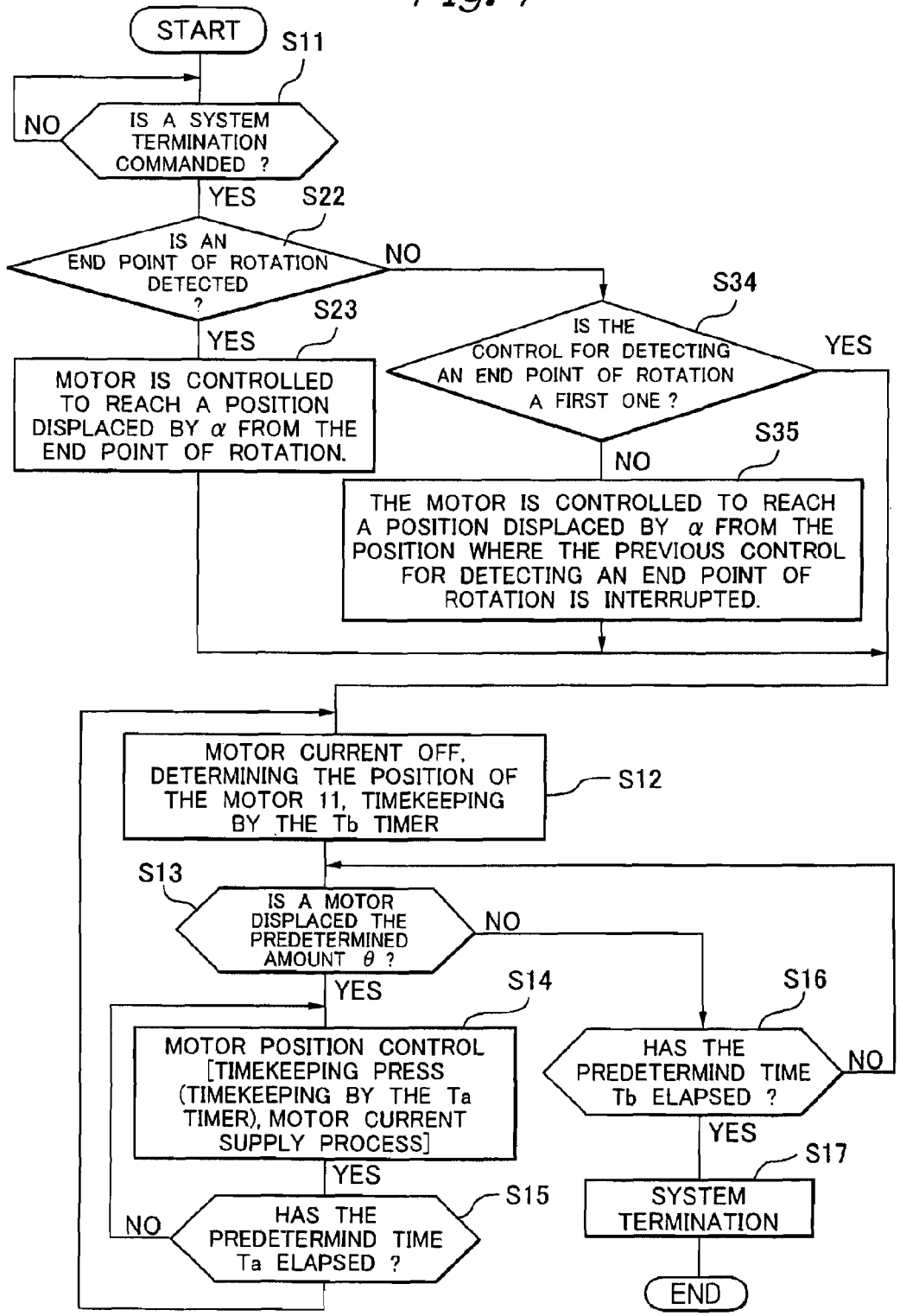
FIG. 7 is a flowchart of an operation of a controller used for a motor-driven disk brake system according to a third embodiment of the present invention.
Figure 8:
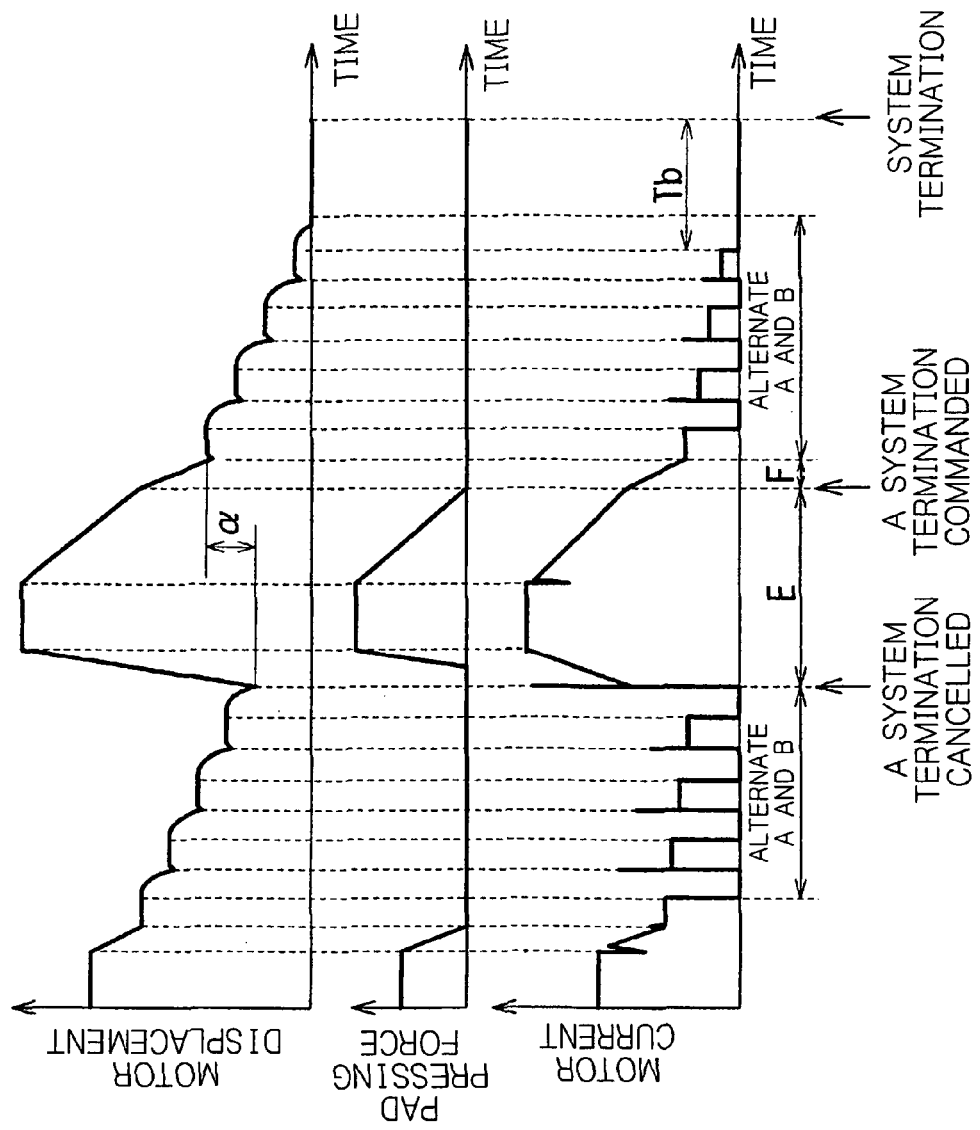
FIG. 8 is a time chart corresponding to the flowchart of FIG. 7.

As shown in FIG. 7, the third embodiment is different from the second embodiment in FIG. 5 in that the third embodiment further comprises steps S34 and S35.

Step S34, which is executed when it is judged no in step S22, determines whether the control for detecting an end point of rotation is not a first one. If yes in step S34, that is, if the control for detecting an end point of rotation is judged as a first one, which means that the control for detecting an end point of rotation has never been interrupted previously, then the process proceeds to step S12. On the other hand, if no in step S34, that is, if the control for detecting an end point of rotation is not a first one, this means that the control for detecting an end point of rotation has been interrupted previously.

If it is judged no in step S34, step S35 is executed, and after the process of step S35, the process proceeds to step S12. In step S35, as shown in FIG. 8, the motor displacement is controlled so as to bring the rotational position of the motor 11 to a position (a predetermined position in front of the interrupted position) at which the piston is pushed a predetermined amount α from the position (end detection interrupted position) where the control for detecting an end point of rotation is interrupted previously (see an interval F in FIG. 8). The predetermined amount α is equal to that of the second embodiment. It is to be noted that the motor displacement can also be controlled to bring the rotational position of the motor 11 to the interrupted position without the predetermined amount α.

In the third embodiment, when the process for the first command for system termination (the control for detecting an end point of rotation) is conducted, as shown in the section of "alternate intervals A and B" on the left side of FIG. 8, before completing a system termination, the system termination is cancelled by a "cancellation of a command for system termination"; a brake operation (a normal brake control) is subsequently conducted again (an interval E in FIG. 8); and a command for system termination (a second command for system termination) is subsequently issued again (yes in step S11 of FIG. 7), then the following control is conducted:

The process proceeds to step S22, judging yes in step S11 of FIG. 7. As described above, since the "cancellation of a command for system termination" is issued before completing a system termination, the process proceeds to step S34, judging no in step S22. As described above, the process for the first command for system termination (control for detecting an end point of rotation) is already conducted, though the system has not been terminated yet. Therefore, judging no in step S34, the process proceeds to step S35. After the process of step S35 is conducted (an interval F in FIG. 8), the process proceeds to step S12 to conduct the second control for detecting an end point of rotation (the section of "alternate intervals A and B" on the right side of FIG. 8).

In the third embodiment, if, after the first command for system termination is issued and then cancelled during the control for detecting an end point of rotation, a normal brake control is conducted again, and a command for system termination (a second command for system termination) is issued again during the normal brake control, then the process of step S35 is conducted (the control of the motor displacement to bring the rotational position of the motor 11 to a position where the piston is pushed a predetermined amount α from the position at which the control for detecting an end point of rotation is interrupted previously). In this way, the motor 11 can be promptly moved to or near in front of the motor displacement point at the time of the previous interruption. As a result, time required for the system termination can be reduced.

Figure 9:
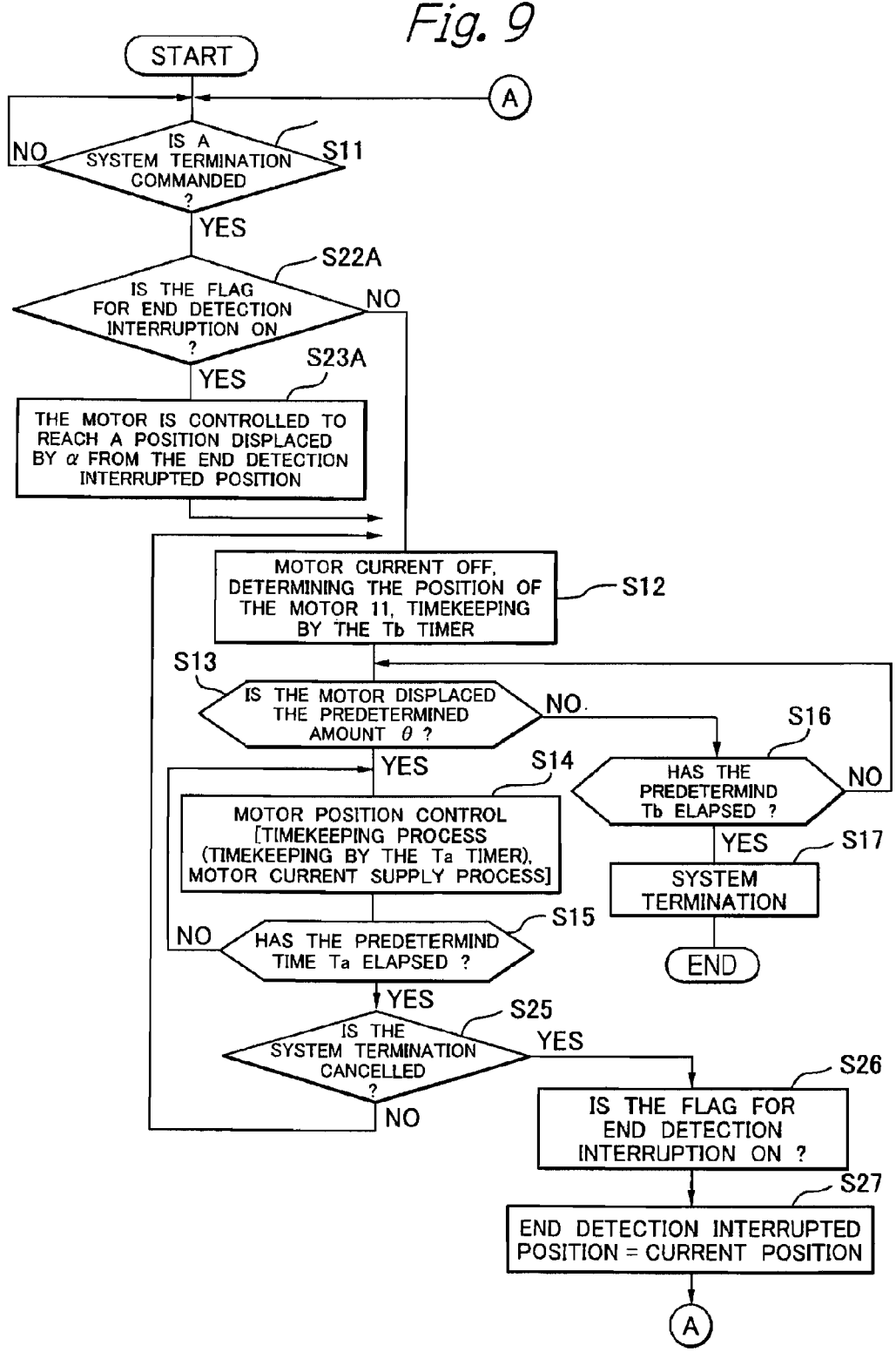
FIG. 9 is a flowchart of an operation of a controller used for a motor-driven disk brake system according to a fourth embodiment of the present invention.

As shown in FIG. 9, steps S25, S26, and S27 can be added to the second embodiment (FIG. 5), substituting steps S22A and S23A for steps S22 and S23 of FIG. 5 (fourth embodiment). In step S23A, the motor displacement is controlled to bring the rotational position of the motor 11 to the position where the piston is pushed the predetermined amount a from the end detection interrupted position.

In the fourth embodiment, if it is judged yes in step S15, it is judged whether the system termination should be cancelled or not (step S25). If it is judged no in step S25, the process returns to step S12. If it is judged yes in step S25, a flag for an end detection interruption is turned on (step S26), and the current position of the motor 11 is taken as an end detection interrupted position (step S27). Then the process returns to step S11. In step S27, the end detection interrupted position is recorded in the memory 101, in addition to the above process.

In the fourth embodiment, if a command for system termination is issued, and it is judged yes in step S11, then a judging process of step S22A is conducted. If the judging process of step S22A is a first one (if the control for detecting an end point of rotation has not been conducted so far), the process proceeds to step S12. Thereafter, the process proceeds as shown in FIG. 3. If it is judged yes in step S15 and no in the subsequent step S25, the process returns to step S12, to conduct a control of alternate intervals A and B, as shown in FIG. 3. When it is judged that the predetermined time Tb has elapsed in step S16, the system is terminated, and the motor displacement point at the time of the system termination is detected (step S17). If a command for system termination is issued (yes in step S11) after the control for detecting an end point of rotation (hereinafter referred to as a first control for detecting an end point of rotation), which comprises the above-described control of alternate intervals A and B and the system termination upon the judgment that the predetermined time Tb has elapsed in step S16, then the following control is conducted:

If it is judged yes in step S11 and then yes in the subsequent S22A, the process of step S23A is conducted, and the process proceeds to step S12. Thereafter, a process, which is substantially the same as that of the second embodiment (FIG. 5), is conducted.

In step S23 of the second embodiment (FIG. 5), the motor 11 is controlled to reach the position of end point of rotation plus the distance α. In step S23A of the present embodiment, however, if the flag for end detection interruption is on, a motor position control at a time of an end detection interruption is conducted to bring the motor 11 to the position of the end detection interrupted position plus the distance α, to thereby turn off the flag for end detection interruption.

In the fourth embodiment, a command for system termination is issued after an end point of rotation is detected during a control for detecting an end point of rotation, and an additional control for detecting an end point of rotation is subsequently conducted. If it is determined that a cancellation for a system termination has been taken place previously during the additional control for detecting an end point of rotation, an end detection interrupted position, which indicates the position of the motor 11, is detected. In this case, the motor displacement is controlled to bring the rotational position of the motor 11 to a position where the piston is pressed a predetermined amount a from the end detection interrupted position (step S23A). In this way, the motor 11 can be promptly moved to near the end detection interrupted position. As a result, time required for the system termination can be reduced.

Figure 10:
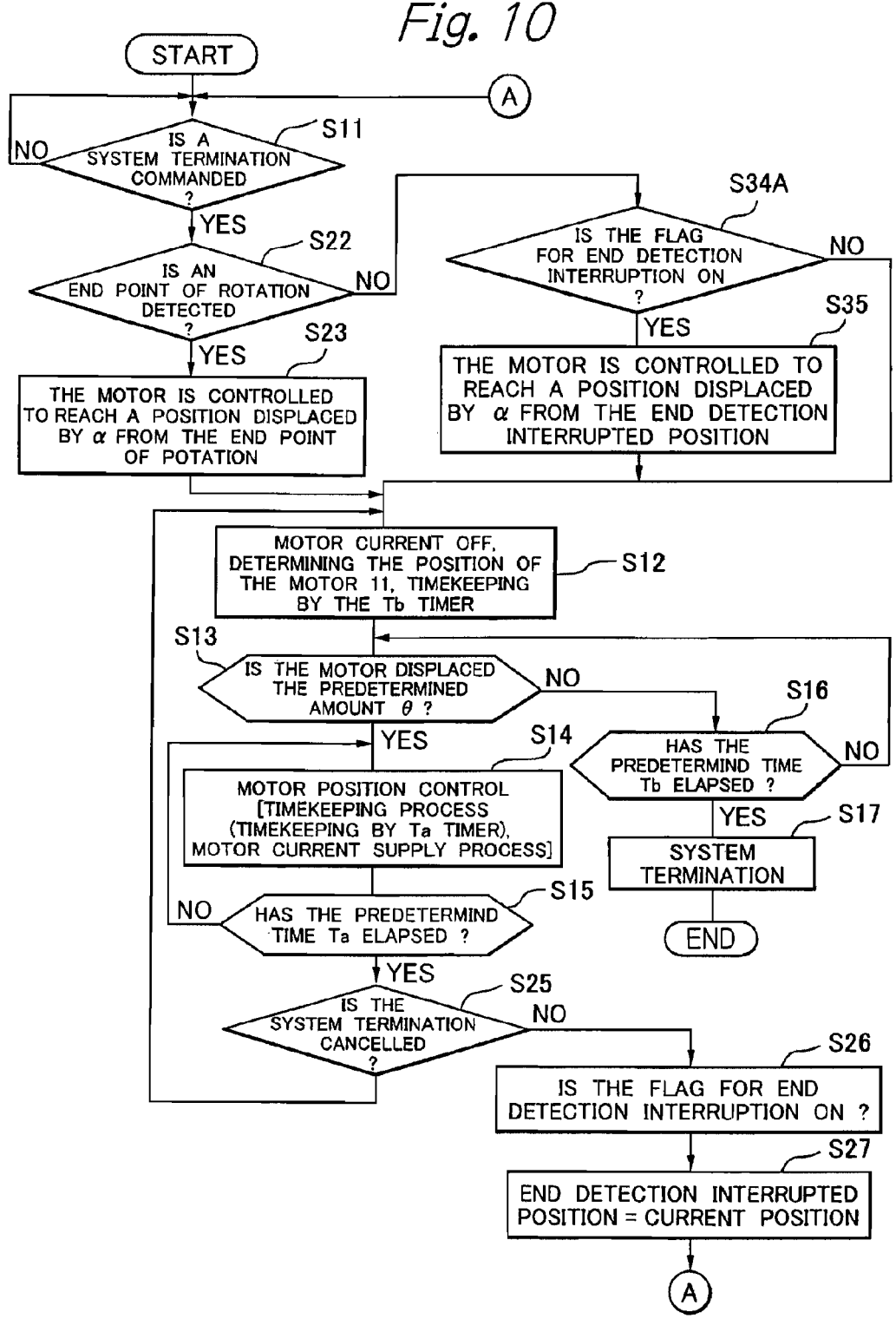
FIG. 10 is a flowchart of an operation of a controller used for a motor-driven disk brake system according to a fifth embodiment of the present invention.

As shown in FIG. 10, steps S34A and S35 can be added to the fourth embodiment (FIG. 9), substituting steps S22 and S23 (see FIG. 5) for steps S22A and S23A of FIG. 9 (fifth embodiment).

Step S34A is executed if it is judged no in step S22. In step S34A, it is determined whether a flag for end detection interruption is on. If it is judged no in step S34A (if the flag for end detection interruption is off), the process proceeds to step S12. If it is judged yes in step S34A, the process proceeds to step S35 and then to step S12. In step S35, a motor position control at a time of end detection interruption is conducted to bring the motor 11 to the position of the end detection interrupted position plus the distance α. In step S35, the flag for end detection interruption is turned off when the motor position control at a time of end detection interruption is conducted.

In the fifth embodiment, when a command for system termination is issued after an end point of rotation is detected during a control for detecting an end point of rotation or after a end detection interrupted position is detected due to a cancellation of system termination, and an additional control for detecting an end point of rotation is subsequently conducted, the end point of rotation or the end detection interrupted position (a position of the motor 11 in the middle of the additional control for detecting an end point of rotation) is read out from the memory. In this case, the motor displacement is controlled to bring the rotational position of the motor 11 to a position where the piston is pressed a predetermined amount α from the end point of rotation or the end detection interrupted position (step S23). In this way, the motor 11 can be promptly moved to near the end point of rotation or the end detection interrupted position. As a result, time required for the system termination can be reduced.

The above-described embodiments are described in terms of an example of reducing an electric current intermittently when a supply of electric power to the motor (electric actuator) 11 is stopped. However, the present invention is not limited to this example, but can be modified to reduce the electric current continuously, which will be described with references to FIGS. 11 and 12 (sixth embodiment).

Figure 11:
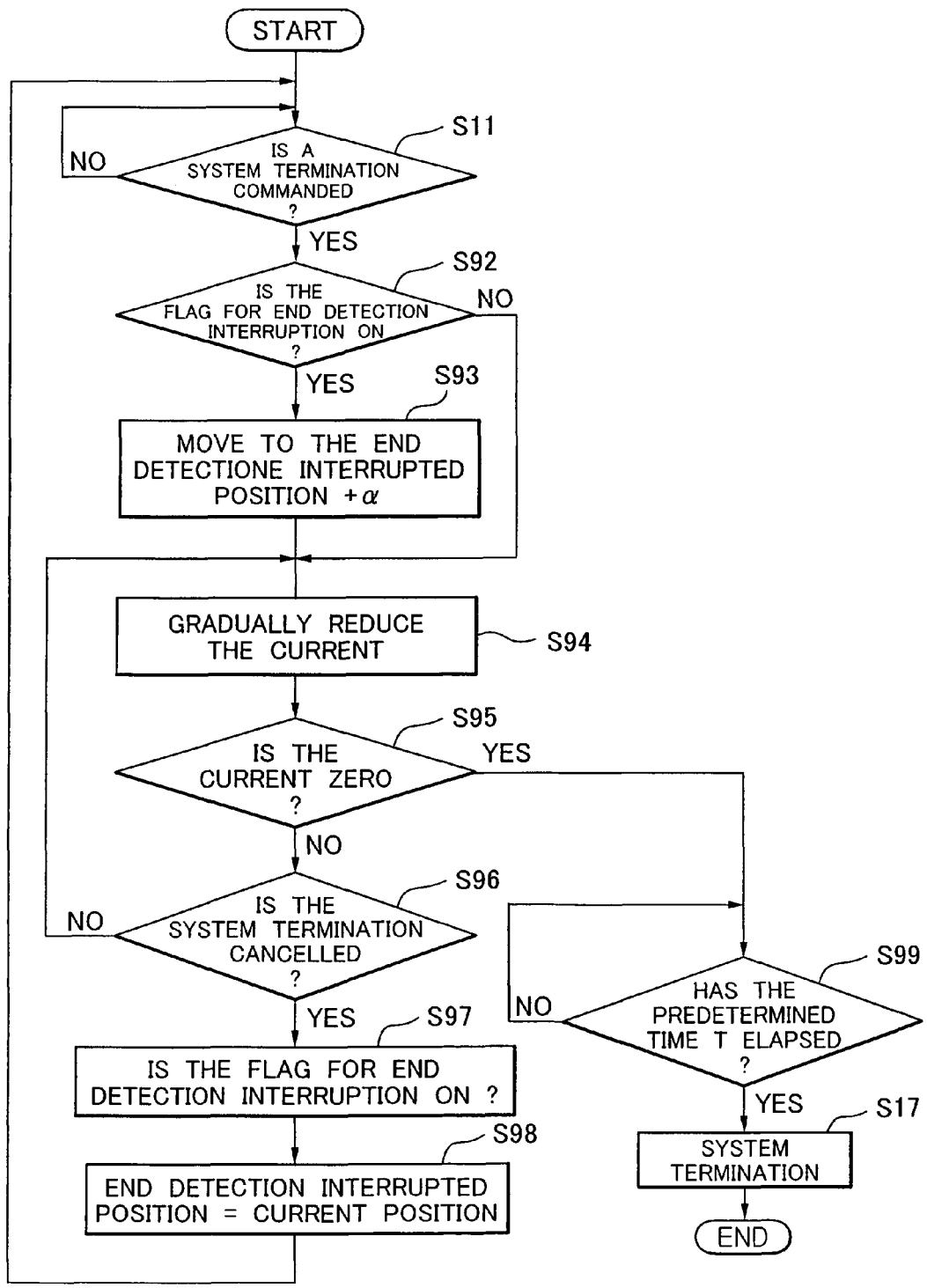
FIG. 11 is a flowchart of an operation of a controller used for a motor-driven disk brake system according to a sixth embodiment of the present invention.

As shown in FIG. 11, in step S92 following step S11, the controller 32 of the sixth embodiment determines whether the flag for end detection interruption is on. If it is judged yes in step S92, the motor position control at a time of end detection interruption is conducted to bring the motor 11 to the position of the end detection interrupted position plus the distance α and to turn off the flag for end detection interruption (step S93). After step S93, the current to the motor 11 is gradually reduced (step S94). If it is judged no in step S92, the process proceeds to step S94.

After step S94, it is determined whether the motor current is zero (0) (step S95). If it is judged no in step S95, it is determined whether a system termination is cancelled (step S96). If it is judged no in step S96, the process returns to step S94. Steps S94, S95, and S17 constitutes a means for stopping a power supply.

If it is judged yes in step S96, the flag for end detection interruption is turned on (step S97), and the current position is recorded as an end detection interrupted position in the memory 101 (step S98). Then the process returns to step S11.

If it is judged yes in step S95, it is determined whether a predetermined time T has elapsed (step S99). If it is judged yes in step S99, a system termination process is conducted (step S17) to terminate the system.

In the sixth embodiment, as shown in FIG. 12, the motor current is reduced continuously after a command for system termination is issued, and the motor displacement is gradually reduced in a similar manner as the motor current, thereby bringing the motor to an end position while reducing the rotational speed of the rotor 25.

In the sixth embodiment as well as the first embodiment, therefore, the piston 10 can be properly stopped near the standby position of non-braking state upon a command for system termination, so as to terminate the system. This reduces time required to bring the piston to the standby position of non-braking state at a next rise time of the motor-driven disk brake system. As a result, the motor-driven disk brake system can be activated promptly.

The above embodiments of the present invention are described in terms of an example of a motor-driven disk brake system using a ball ramp mechanism 12 as a rotary-linear motion converter, as shown in FIGS. 1 and 2. However, the motor-driven disk brake system is not limited to the one using such a ball ramp mechanism, but a ball screw or the like can be used as the rotary-to-linear motion converter (see, for example, U.S. Pat. No. 6,250,436). It is to be noted that the present invention is applicable to any motor-driven disk brake system having a pressing member that is prone to move beyond a predetermined position due to use of an urging means or inertia, when a power supply to the motor is stopped.

As described in the above embodiments of the present invention, when operation of the motor-driven disk brake system is stopped, the motor current is gradually reduced. Correspondingly, the motor displacement is gradually reduced. In this way, the return force such as a torque stored in the electric caliper during a braking operation is gradually spent on a return displacement of a pressing member, such that the operation of returning the pressing member can be smoothly brought to a halt. This makes it possible to prevent a large backward movement (thus a backward movement of the pressing member beyond a predetermined position) of the pressing member due to inertia, which may occur when the return force acts all at once on the return displacement of the pressing member. In this way, when the operation of the motor-driven disk brake system is stopped, the pressing member can be properly stopped at the standby position of non-braking state. As a result, the motor-driven disk brake system can be promptly activated next time.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2006-182409 filed on Jun. 30, 2006 including specification, claims, drawings and summary is incorporated herein by reference in its entirety.

What is claimed is:

1. A motor-driven disk brake system comprising:
   an electric caliper having an electric actuator that is adapted to move a pressing member in a first direction for pressing a brake pad against a rotating body; and
   a control device for supplying an electric power to the electric actuator to control the electric actuator,
   wherein the electric caliper is adapted to return the pressing member in a second direction opposite to the first direction when a supply of electric power from the control device is stopped,
   wherein the control device is adapted to reduce an amount of current and then stop the power supply, so as to gradually return the pressing member, in a first operation of stopping the power supply to the electric actuator,
   wherein, when the first operation of stopping the power supply is interrupted in the middle of the first operation of stopping the power supply, the system enters a condition that the electric power is supplied to the electric actuator,
   wherein, when the control device conducts a second operation of stopping the power supply to the electric actuator after the first operation of stopping the power supply is interrupted in the middle of the first operation of stopping the power supply, the control device returns the pressing member to an interrupted position or a predetermined position in front of the interrupted position, and then gradually returns the pressing member, and
   wherein the return to the interrupted position or the predetermined position in front of the interrupted position is faster than the gradual return of the pressing member.

2. A motor-driven disk brake system according to claim 1, wherein the electric actuator comprises an electric motor and a rotary-to-linear motion converter for converting a rotary motion of the electric motor to a linear motion, and
   wherein the rotary-to-linear motion converter is adapted to move the pressing member in the first direction.

3. A motor-driven disk brake system according to claim 2, wherein the electric caliper includes a position detecting means for detecting a position of the pressing member,
   wherein the position detecting means is made of a rotational position detecting means for detecting a rotational position of a rotor of the electric motor, and
   wherein the control device is adapted to intermittently supply electrical current in the first operation of stopping the power supply to the electric actuator, and to reduce stepwise the amount of the supplied electrical current based on a value detected by the rotational position detecting means.

4. A motor-driven disk brake system according to claim 2, wherein the rotary-to-linear motion converter has a rotary motion member which includes:
   a return spring for returning the pressing member in the second direction; and
   an engaging portion for preventing the rotary motion member from being excessively moved back by the return spring.

5. A motor-driven disk brake system according to claim 4, wherein the electric caliper includes a position detecting means for detecting a position of the pressing member,
   wherein the position detecting means is made of a rotational position detecting means for detecting the rotational position of the rotor of the electric motor,
   wherein the control device is adapted to intermittently supply electrical current in the first operation of stopping the power supply to the electric actuator, and
   wherein the control device is adapted to supply electric current to hold the pressing member at a position at which it is determined that the pressing member has moved in the second direction by a predetermined amount based on a value detected by the rotational position detecting means, when the electrical current is not supplied, and to repeat the process in which electrical current is supplied and the process in which electrical current is not supplied each time the pressing member moves in the second direction by the predetermined amount.

6. A motor-driven disk brake system according to claim 1, wherein the control device is adapted to hold the pressing member in a standby position by a predetermined current when the brake pad is not pressed against the rotating body by the pressing member.

7. A motor-driven disk brake system according to claim 5, wherein the control device is adapted to detect that the pressing member has reached an end position when the electrical current is not supplied and a position signal from the position detecting means remains unchanged for a predetermined period of time.

8. A motor-driven disk brake system according to claim 7, wherein, when the control device stops the electric power after the control device detects that the pressing member has reached the end position and then the system enters a condition that the electric power is supplied for operation of the electric actuator, the control device returns the pressing member to a predetermined position in front of the end position based on position detection by the position detecting means, and then returns the pressing member gradually.

9. A control device for a motor-driven disk brake system, the control device being adapted to supply an electric power to an electric caliper, such that a pressing member for pressing a brake pad against a rotating body is moved in a first direction by an electric actuator and, when a power supply to the electric actuator is stopped, the pressing member is moved back in a second direction opposite to the first direction,
   wherein the control device is adapted to reduce an amount of current and then stop a power supply to the electric actuator, so as to gradually return the pressing member, in a first operation of stopping the power supply to the electric actuator,
   wherein, when the first operation of stopping the power supply is interrupted in the middle of the first operation of stopping the power supply, the system enters a condition that the electric power is supplied to the electric actuator,
   wherein, when the control device conducts a second operation of stopping the power supply to the electric actuator after the first operation of stopping the power supply is interrupted in the middle of the first operation of stopping the power supply, the control device returns the pressing member to an interrupted position or a predetermined position in front of the interrupted position, and then gradually returns the pressing member, and
   wherein the return to the interrupted position or the predetermined position in front of the interrupted position is faster than the gradual return of the pressing member.

10. A control device for a motor-driven disk brake system according to claim 9, wherein the control device adapted to intermittently supply electrical current in the first operation of stopping the power supply to the electric actuator, and
   wherein the control device is adapted to apply electric current to hold the pressing member at a position at which it is determined that the pressing member has moved in the second direction by a predetermined amount based on a value detected by a position detecting means of the electric caliper which detects a position of the pressing member, when the electrical current is not supplied, and to repeat the process in which electrical current is supplied and the process in which electrical current is not supplied each time the pressing member moves in the second direction by the predetermined amount.

11. A control device for a motor-driven disk brake system according to claim 10, wherein the control device is adapted to detect that the pressing member has reached an end position when the electrical current is not supplied and a position signal from the position detecting means remains unchanged for a predetermined period of time.

12. A control device for a motor-driven disk brake system according to claim 11, wherein, when the control device stops the electric power after the control device detects that the pressing member has reached the end position and then the system enters a condition that the electric power is supplied for operation of the electric actuator, the control device returns the pressing member to a predetermined position in front of the end position based on position detection by the position detecting means, and then returns the pressing member gradually.

13. A motor-driven disk brake system including:
an electric actuator comprising an electric motor and a rotary-to-linear motion converter for converting a rotary motion of the electric motor to a linear motion;
an electric caliper in which the rotary-to-linear motion converter moves a pressing member in a first direction for pressing a brake pad against a rotating body; and
a control device for supplying an electric power to the electric motor to control the electric motor,
wherein the electric caliper includes a position detecting means for detecting a position of the pressing member, the position detecting means being made of a rotational position detecting means for detecting the rotational position of the rotor of the electric motor, and
wherein the electric caliper is adapted to return the pressing member in a second direction opposite to the first direction when a supply of electric power from the control device is stopped,
wherein the control device is adapted to reduce an amount of current so as to gradually return the pressing member and then stop a power supply to the electric actuator, in a first operation of stopping the power supply to the electric motor,
wherein the control device is adapted to detect that the pressing member has reached an end position, when the electrical current is not supplied and a position signal from the position detecting means remains unchanged for a predetermined period of time,
wherein, when the control device conducts a second operation of stopping the power supply after the control device detects that the pressing member has reached the end position and then the system enters a condition that the electric power is supplied for operation of the electric actuator, the control device returns the pressing member to a position which is a predetermined amount in front of the end position, and then gradually returns the pressing member, and
wherein the return to the position which is a predetermined amount in front of the end position is faster than the gradual return of the pressing member.

14. A motor-driven disk brake system according to claim 13, wherein the control device reduces the amount of an amount of electric current stepwise in the first operation of stopping the power supply to the electric motor.

15. A motor-driven disk brake system according to claim 1, wherein the electric caliper includes a position detecting means for detecting a position of the pressing member,
wherein a memory is connected to the control device,
wherein the control device is adapted to record a position detected by the position detecting means as an interrupted position on the memory when the first operation of stopping the power supply is interrupted in the middle of the first operation of the stopping the power supply.

16. A control device for a motor-driven disk brake system according to claim 9, wherein a position detecting means for detecting a position of the pressing member and a memory are connected to the control device,
wherein the control device is adapted to record a position detected by the position detecting means as an interrupted position on the memory when the first operation of stopping the power supply is interrupted in the middle of the first operation of the stopping the power supply.

17. A motor-driven disk brake system according to claim 13, wherein the electric caliper includes a position detecting means for detecting a position of the pressing member,
wherein a memory is connected to the control device,
wherein the control device is adapted to record a position detected by the position detecting means as an end position on the memory, when the control device detects that the pressing member has reached an end position.

18. A motor-driven disk brake system according to claim 1, wherein the control device is adapted to reduce an amount of current continuously in the first operation of the stopping the power supply to the electric actuator.

19. A control device for a motor-driven disk brake system according to claim 9, wherein the control device is adapted to reduce an amount of current continuously in the first operation of the stopping the power supply to the electric motor.

20. A motor-driven disk brake system according to claim 13, wherein the control device is adapted to reduce an amount of current continuously in the first operation of the stopping the power supply to the electric motor.

* * * * *